US005553269A

United States Patent [19]

Nunes

[11] Patent Number: 5,553,269
[45] Date of Patent: Sep. 3, 1996

[54] APPARATUS FOR MONITORING SENSOR INFORMATION FROM DIFFEERENT TYPES OF SOURCES

[75] Inventor: Antonio C. D. Nunes, Florianpolis, Brazil

[73] Assignee: International Business Machines Corporation, Armonk, N.Y.

[21] Appl. No.: 761,180

[22] Filed: Sep. 17, 1991

[30]   Foreign Application Priority Data

Sep. 19, 1990 [BR] Brazil .................................. 9004680

[51] Int. Cl.$^6$ ................. G06F 1/12; G06F 3/05; G06F 13/42
[52] U.S. Cl. .................. 395/500; 364/DIG. 1; 364/DIG. 2; 340/825.15; 395/200.1
[58] Field of Search .................................. 395/800, 200, 395/375, 275, 500, 775, 700, 725, 550, 250; 364/DIG. 1, DIG. 2, 470, 468, 431.04, 180, 550, 516, 131, 138, 140, 141; 379/255; 371/29.1, 16.4, 22.3

[56]   References Cited

U.S. PATENT DOCUMENTS

| | | | |
|---|---|---|---|
| 4,479,034 | 10/1984 | Brightmam et al. | 379/255 |
| 4,497,031 | 1/1985 | Froehling et al. | 364/557 |
| 4,509,047 | 4/1985 | Rhyner | 364/180 |
| 4,517,637 | 5/1985 | Cassell | 364/138 |
| 4,607,327 | 8/1986 | Kishi et al. | 364/180 |
| 4,831,558 | 5/1989 | Shoup et al. | 364/550 |
| 4,849,906 | 7/1989 | Chodos et al. | 364/516 |
| 4,987,539 | 1/1991 | Moore et al. | 364/413.08 |
| 5,084,875 | 1/1992 | Weinberger et al. | 371/29.1 |
| 5,150,288 | 9/1992 | Imai et al. | 364/468 |
| 5,153,840 | 10/1992 | Shigeta et al. | 364/470 |
| 5,161,110 | 11/1992 | Dorchak | 364/468 |
| 5,189,623 | 2/1993 | Komuro et al. | 364/470 |
| 5,200,900 | 4/1993 | Adrain et al. | 364/431.04 |
| 5,204,913 | 4/1993 | Morooka et al. | 364/470 |

*Primary Examiner*—Daniel H. Pan
*Attorney, Agent, or Firm*—Arthur J. Samodovitz

[57]   ABSTRACT

An apparatus receives real time input of sensor information from a plurality of different sources with different interfaces, converts the format of the sensor information into a format compatible with a computer, and transmits the converted sensor information to the computer. The apparatus comprises a plurality of collectors respectively coupled to the sensors for receiving the sensor information. A scan generator is coupled to the collectors and selects each of the collectors for input of the respective sensor information en route to the computer. The scan generator provides timing signals to control the input of the sensor information from each of the collectors. A converter receives the sensor information from the collectors and convert the formats of the sensor information to a format compatible with the computer. Each of the collectors transmits the respective sensor information to the converter based on timing signals provided by the scan generator but receives the sensor information from the respective sensors independent of the scan generator timing signals. Thus, the sensor input is not limited in either format or timing. After the converted sensor information is input to the computer, a server program which is executing within the computer and has knowledge of the original format of the sensor information from each source and the nature of the conversion, converts the converted sensor information back into the original format. Then, a user application program which is also executing within the computer receives the sensor information in its original format which is the expected format.

8 Claims, 14 Drawing Sheets

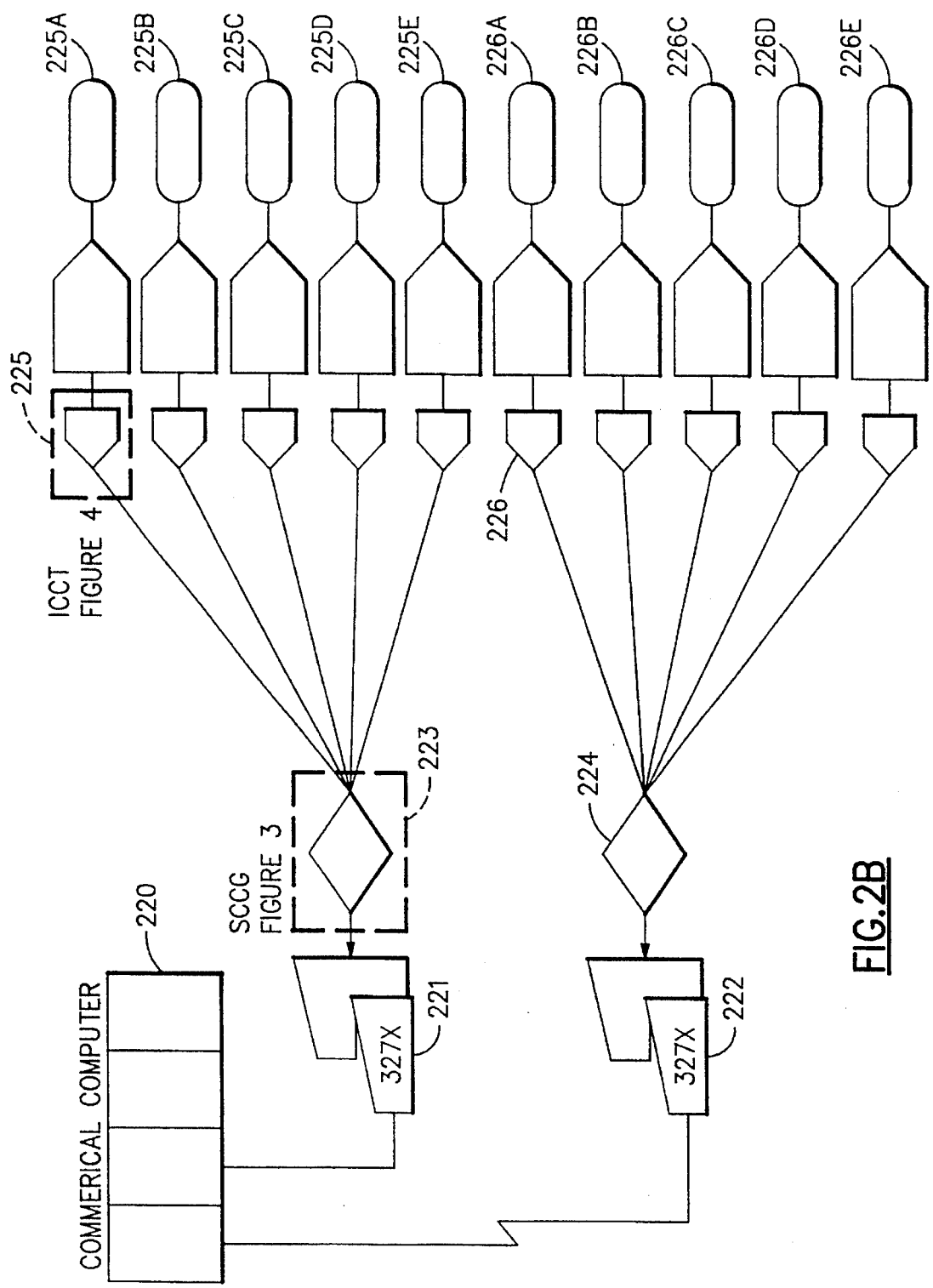

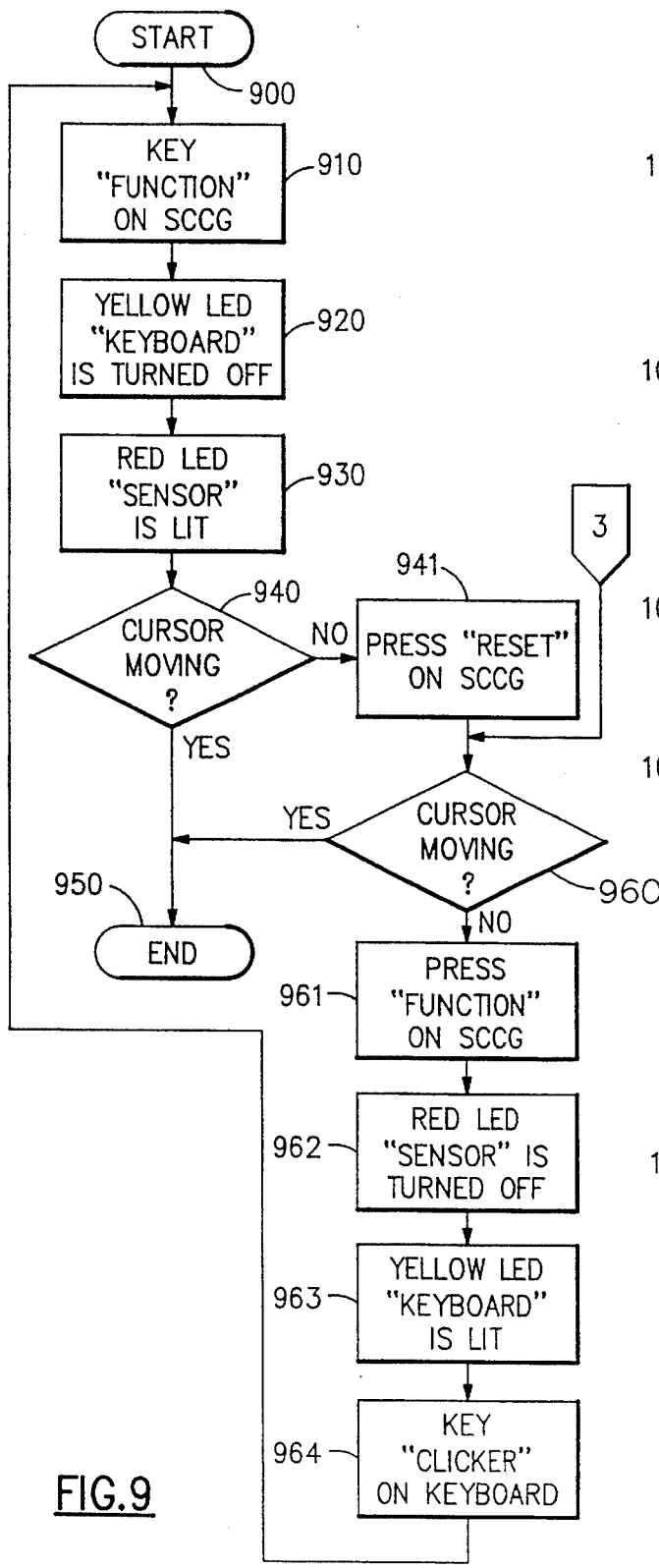
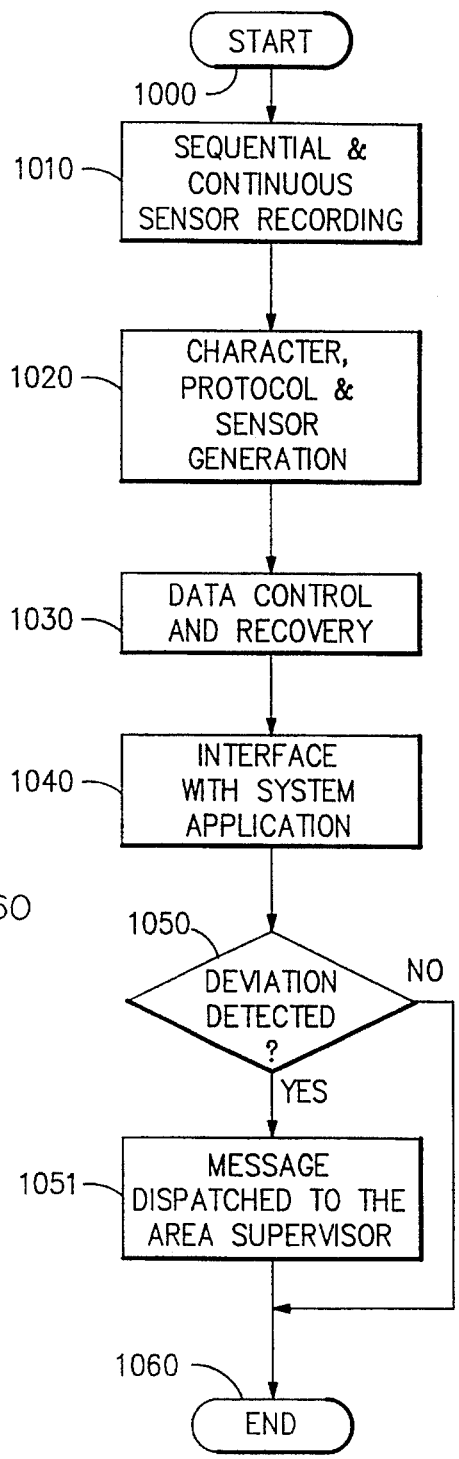
FIG.9
FIG.10

APPARATUS FOR MONITORING SENSOR INFORMATION FROM DIFFEERENT TYPES OF SOURCES

FIELD OF THE INVENTION

The present invention relates generally to sensing, controlling and monitoring equipment either for industrial environments or any other application and, more particularly, to an electronic equipment that may be used connected to any video terminal, chiefly an IBM 3270 type of a compatible unit, for real time sensing, controlling and monitoring of other devices using its own interface.

PRIOR ART

This invention has arisen from a specific need in a special type of industrial activity: the textile area, which for a long time has been looking for the possibility of making their conventional equipment compatible with modern business alternatives of computational processing, diminishing at the same time the response time for error correction that constituted a drawback to yield increase and loss decrease during the manufacturing process, Although this specific area has given rise to the problem motivating the invention, the final solution resulted in an equipment having multifunction serial and parallel inputs, with a wide application and/or requirement scope, capable of receiving and handling data and information in a bit-by-bit, 2 bit, 4 bit, 8 bit, 16 bit, 32, 64, 128 and up basis, to the limit of 1920 bits each time, totally expandable and universally compatible with other equipment systems and protocols.

BACKGROUND OF THE INVENTION

Despite the present state of art in most countries and mainly in less developed ones, not rarely a big industrial plant having several equipment manufactured in the past can be found, which are not suited for updating. The latter, called conventional equipment, operate side by side with a large variety of modern equipment. For modern equipment one shall understand apparatuses and devices having automation or not, standing along or controlled through industrial computer systems, presenting as many interface types as may be the number of models, manufacturers and applications addressed, production style, marketing needs, economical conditions, etc.

Even when coexisting with new devices required by technology advance, conventional equipment are unsuited to communicate to control equipment, or business computers used by industry or the owner company, although they should be integrated to the control process. This happens because each area in the same company may have its own language, or terminology, and requirements, which may be too complex for integration and yet because each equipment manufacturer or industry owner eventually has its own marketing goals and industrial secrets that cannot be disclosed. Thus, up to now it has been very difficult, if not impossible, to create an economic, reliable, fast and compatible solution to this problem.

If for one side this situation can be realized, for the other it is unacceptable that we shall remain underdeveloped to accomplish high yield and reach progress and quality standards through the constraint of using manual controls. Even when the latter relate to conventional equipment only and their production control data, or else to modern devices and their derived information, concerning an automated process, this lack of connectivity due to equipment variable complexity, methods, communication patterns or protocols, requirements, languages, etc. is not reasonable.

It is also unsatisfactory that all these systems and functions cannot be integrated and designed far economic optimization, free of their specific nature or area to which they are technically related.

This asynchronous performance of industry most times creates the need for drastic changes in existing plants, sometimes impossible unless a massive investment is carried ion. Therefore, industries choose the adoption of a lower technological standard for operation, according to the related social and financial ambient, assuming a priority that some problems should survive to this so called modernization, that obviously should not root up the question, expending funds without getting the expected and suitable return.

From manual records in file cards, production line data are manually entered into computing systems together with administrative and/or business data, the outputs or reports or lists of which are then sent to process analysts, sometimes through non-electronic or automated mailing services.

Only after all that, may analysts detect continued errors or distortions that shall repeat in the production line along the process already mentioned. It can be easily derived that when a correction occurs, the production cost shall be already affected by time, material, labor and money irreversibly lost in an uncorrection production, or else with product quality at least seriously lowered.

Although in some instances one can find a correct,on time of about 48 hours after problem detection, an average time ranging from 17 to 24 hours is normally found into the textile industry, for example.

Up to now, in an effort to solve the problem, suppliers of control technology have presented unsatisfactory modes, despite high investments in microcomputer networks. This is because essential requirements are not fulfilled or privileged information is required, or yet partial or not integrated solutions are presented invalidating the whole process, since human mistakes eventually made during non- automated data handling operations cannot be avoided.

Intermediate processes using a magnetic devices as data recording medium, acting as support for business systems, are not capable to surpass the barriers of speed and synchronism among data collection, related analysis and reaction for distortion correction. They are also unsuitable in an industrial environment whether for damages from magnetic and electromagnetic radiation or the generation of the necessity for other controls related to this medium, adding cost, bureaucracy and complexity to the process itself.

Computer interfaces for several sensors are broadly known, but their hardware and particularly their software development are carried at high cost, turning them into highly dedicated specialists that can be hardly updated, changed of altered and even adapted for another industry of equipment type. Besides, the inexistence of such an apparatus compatible to all protocols, transmission rates and data processing, modern technology improvements, etc., finally jeopardizes the benefits offered.

Another drawback for the development of a solution unto now has been the particular activities of certain industries, mainly textile industries, relying on some manual operations where automation is not yet possible yet, regardless the required quantity or quality of the final product. Into these environments due to their inherent characteristics there is little space, although there is intense motion, leading thus to a physical restriction related to the implementation and use of a computer terminal exactly where it could be more necessary.

All the above-mentioned constraints have led to the creation of a solution as fast, reliable, integrated, compatible and versatile as simple, easy to handle, economic and financially feasible and free from lack of space.

OBJECTS OF THE INVENTION

This invention is designed to fulfill all requirements already mentioned and several others, showing the following particular characteristics:

1) capable to universally sense and interface and also to operate with any word length, from 1 to 1920 bits (and also expanding this limit);

2) easily connected to any sensor (open technology) and/or any equipment (having serial or parallel I/O), allowing for real time processing and decreasing the time elapsed between error detection and correction to seconds, mainly in the textile industry where this average time varied from 17 to 24 hours.

The apparatus embodying the invention may be connected to any video terminal of the IBM 3270 type or similar for one side and locally or through a communication network to any other known equipment or industrial device type.

As a consequence of its reduced size, it may be also used in handicraftsman operation areas having manual sensing or not.

Some of the applications in the textile area are sensing and control of loom strikes, or any other linear motions of their equipment, work shifts, working time, equipment stoppage time, installation or machine start up time, etc.

It is also an object of the present invention to provide an apparatus for sensing and controlling the rotation speed of machines, motors, acceleration and deceleration and operation cut off, etc.

It also applies to temperature sensing of materials in any state (solid, liquid of gaseous), as well as to monitoring irradiation of thermal dissipation values in equipment in general, while allowing pH measurement of chemical products and implements and other characteristics such as density, viscosity and dilation of products and materials of all kinds.

The invention may also be used for colorimetry and likewise for luminosity and/or luminous intensity control, as well as any other type infrared radiation and X-rays, ultrasound, etc. It may still work under high speed, sensing voltage, current, power and frequency levels, identifying peaks and deviations whether in amplitude or time, etc.

The apparatus forming this invention can be easily adapted to sense capacitance meters, detect presence and/or motion, carry magnetic, electromagnetic or hertzian controls, being able for easy connection to nuclear radiation sensors up to interstellar radiation detectors.

If associated to special systems and connected to motion control equipment for pressure and temperature, air moisture and density, it could monitor accurately measurements of all atmospheric and navigation conditions through a great territorial extend.

Furthermore, the apparatus of the invention can record measurements into electric and electromagnetic comparators, in open and close operations of switches, relays or similar elements, in failures of voltage sources, into frequency shift comparators, sound equipment, levels of atmospheric exhaustion, etc.

It could be also used for agriculture to sense in an integrated way conditions to optimize plant, vegetable, potherb and fruit development when associated to specialist systems, in order to effectively contribute to productivity and aliment quality improvement.

One object of this invention is to provide methods that shall allow for the full operation of said apparatus. The apparatus itself, as well as the related methods shall be described when the preferred embodiment is disclosed.

SUMMARY

The invention resides in an apparatus for real time input of sensor information from a plurality of different sources to a computer for processing. The sources have a variety of different interfaces but the computer has a fixed format for data input. The apparatus comprises a plurality of collectors respectively coupled to the sensors for receiving sensor information. A scan generator is coupled to the collectors and selects each of the collectors for input of the respective sensor information en route to the computer. The scan generator provides timing signal to control the input of the sensor information from each of the collectors. A converter is coupled to receive the sensor information from the collectors and convert the formats of the sensor information to a format compatible with the computer. Each of the collectors transmits the respective sensor information to the converter based on timing signals provided by the scan generator but receives the sensor information from the respective sensors, independent of the scan generator timing signals. Thus, the sensor input is not limited in either format or timing.

After the converted sensor information is input to the computer, a server program which is executing within the computer and has knowledge of the original format of the sensor information from each source and the nature of the conversion, converts the converted sensor information back into the original format. Then, a user application program which is also executing within the computer receives the sensor information in its original format which is the format expected by the user application program. Thus, the apparatus receives sensor input from a plurality of different sources with different formats, and converts the inputs to a format compatible with a computer input. Finally, a server program within the computer reconverts the converted sensor input back into its original form for use by an application program. No changes need be made to the sensor interface of computer interface.

BRIEF DESCRIPTION OF THE DRAWINGS

FIG. 2B depicts the invention included into a computerized line environment.

FIG. 9 depicts a flowchart of an actuation method for the equipment.

FIG. 10 shows a flowchart of an equipment operating cycle.

DESCRIPTION OF THE PREFERRED EMBODIMENT

Figure 1A:
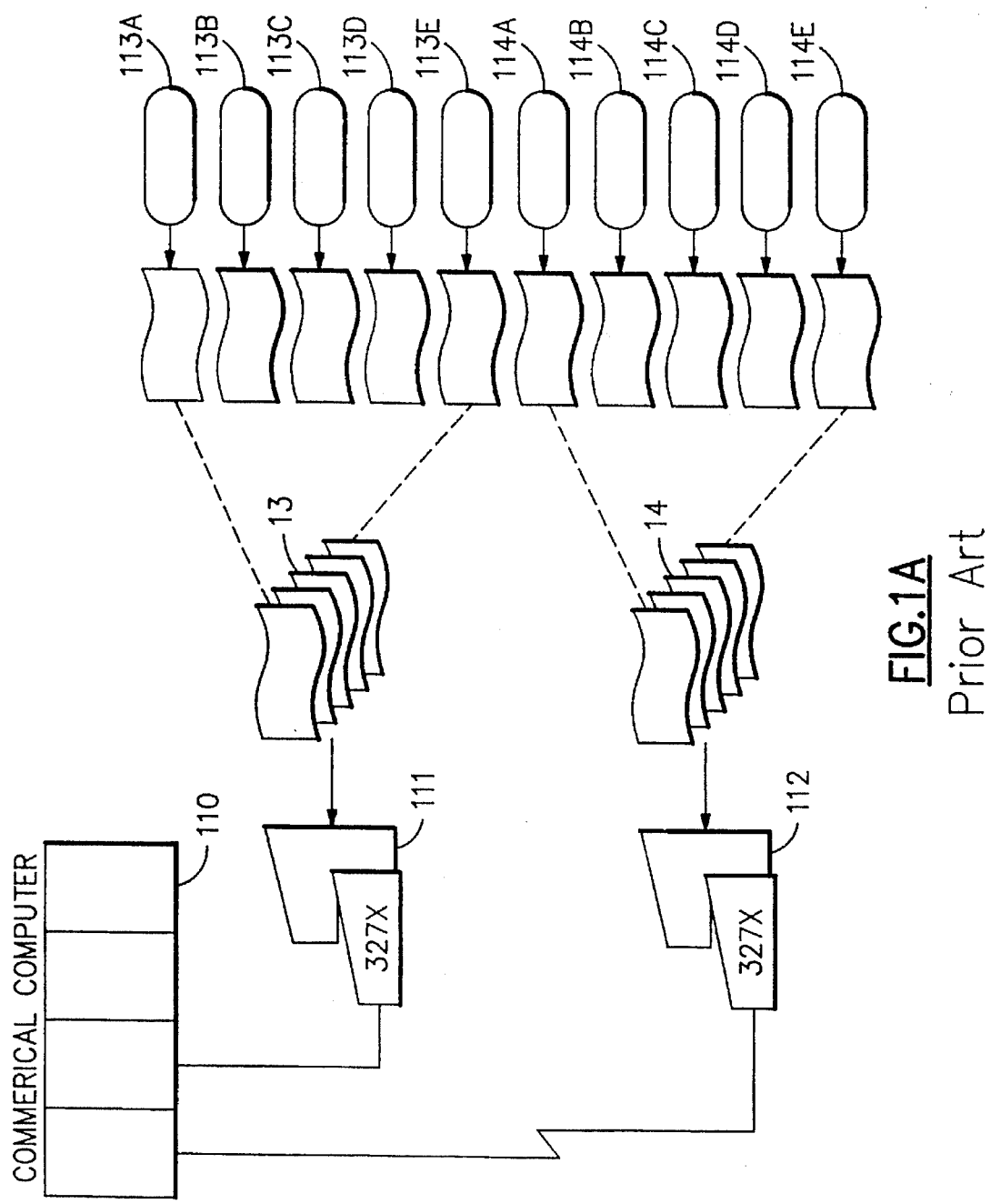
FIG. 1A shows the prior art in a handicraftsman environment.
Figure 1B:
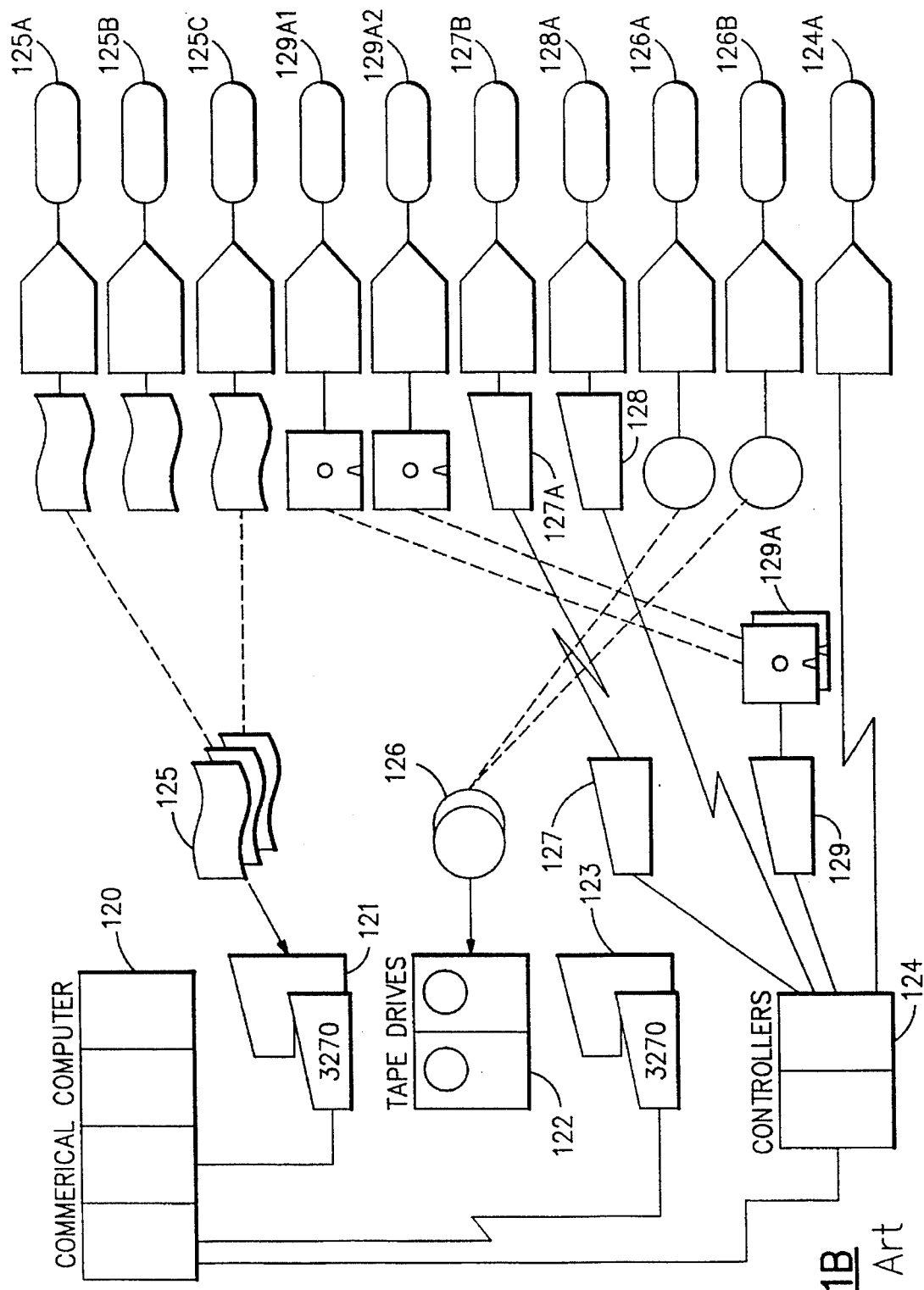
FIG. 1B shows the prior art in a computerized line environment.
Figure 1C:
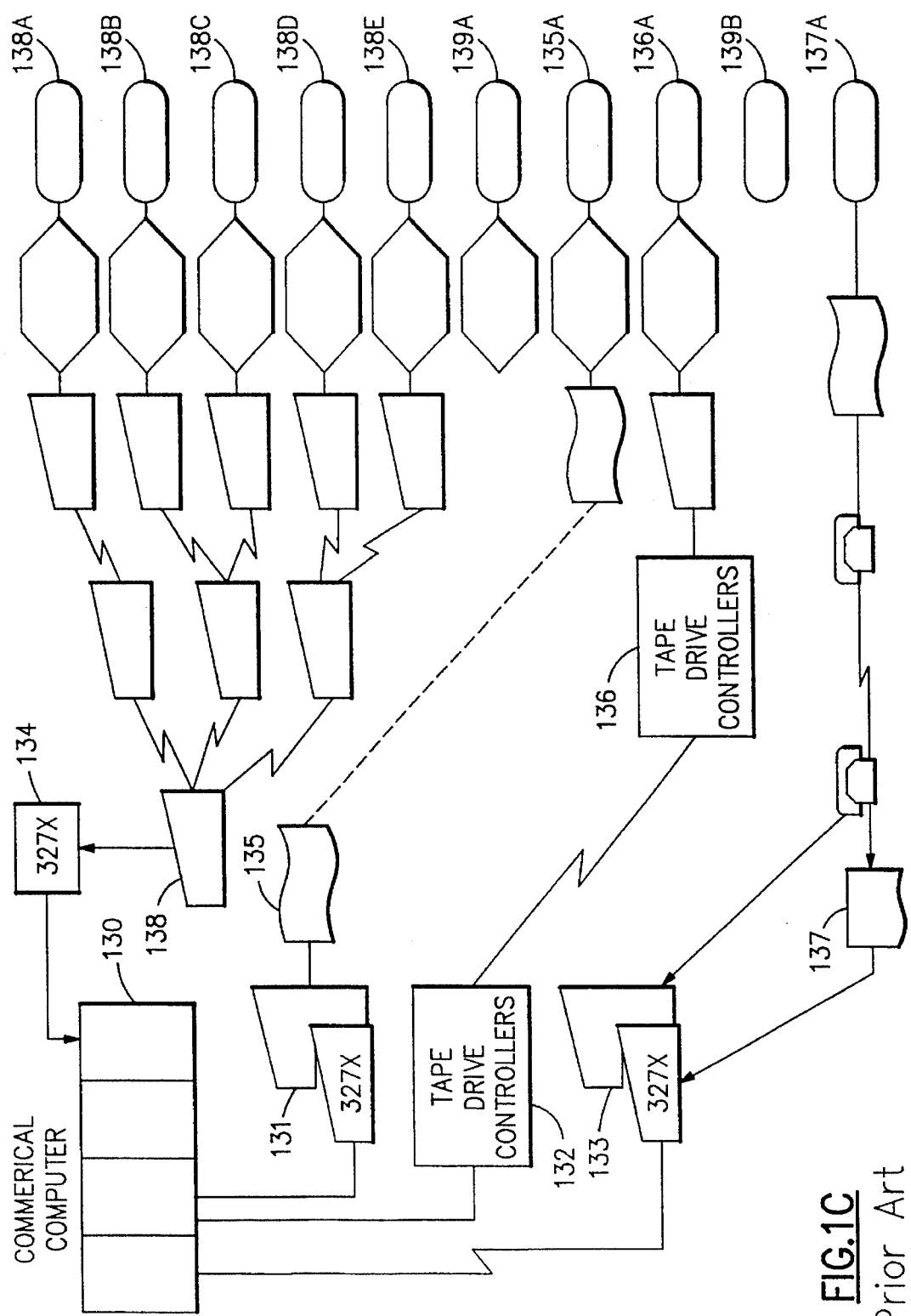
FIG. 1C depicts the prior apt in an environment controlled through a microcomputer network having remote stations.

FIGS. 1A, 1B and 1C show different types of manual operations and information exchanges exactly as they happen nowadays without the present invention. Handling errors, as well as all other types of human errors may occur during this process for all activities shown into the figures by dotted lines.

Figure 2A:
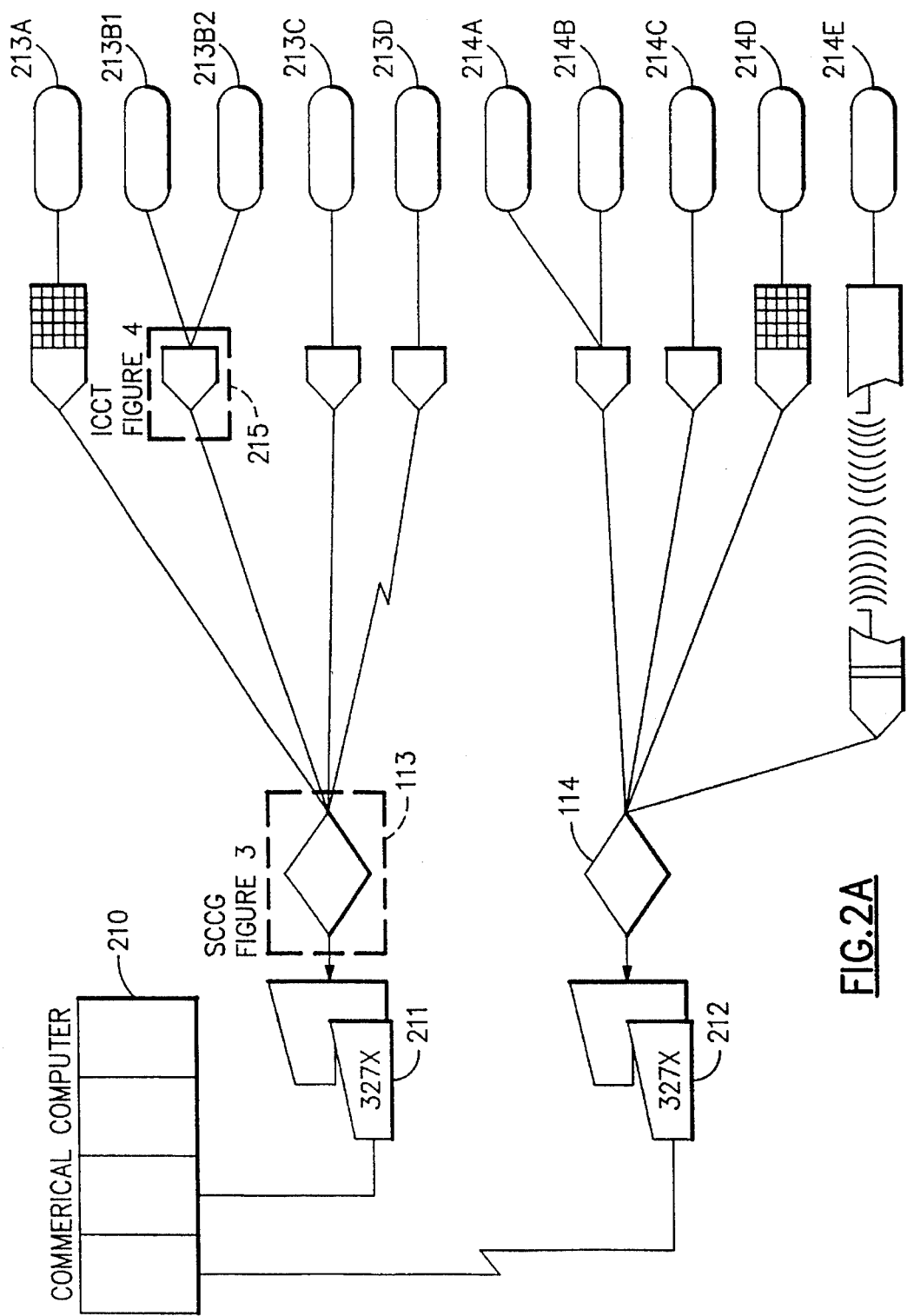
FIG. 2A shows the invention included in a handicraftsman environment.
Figure 2C:
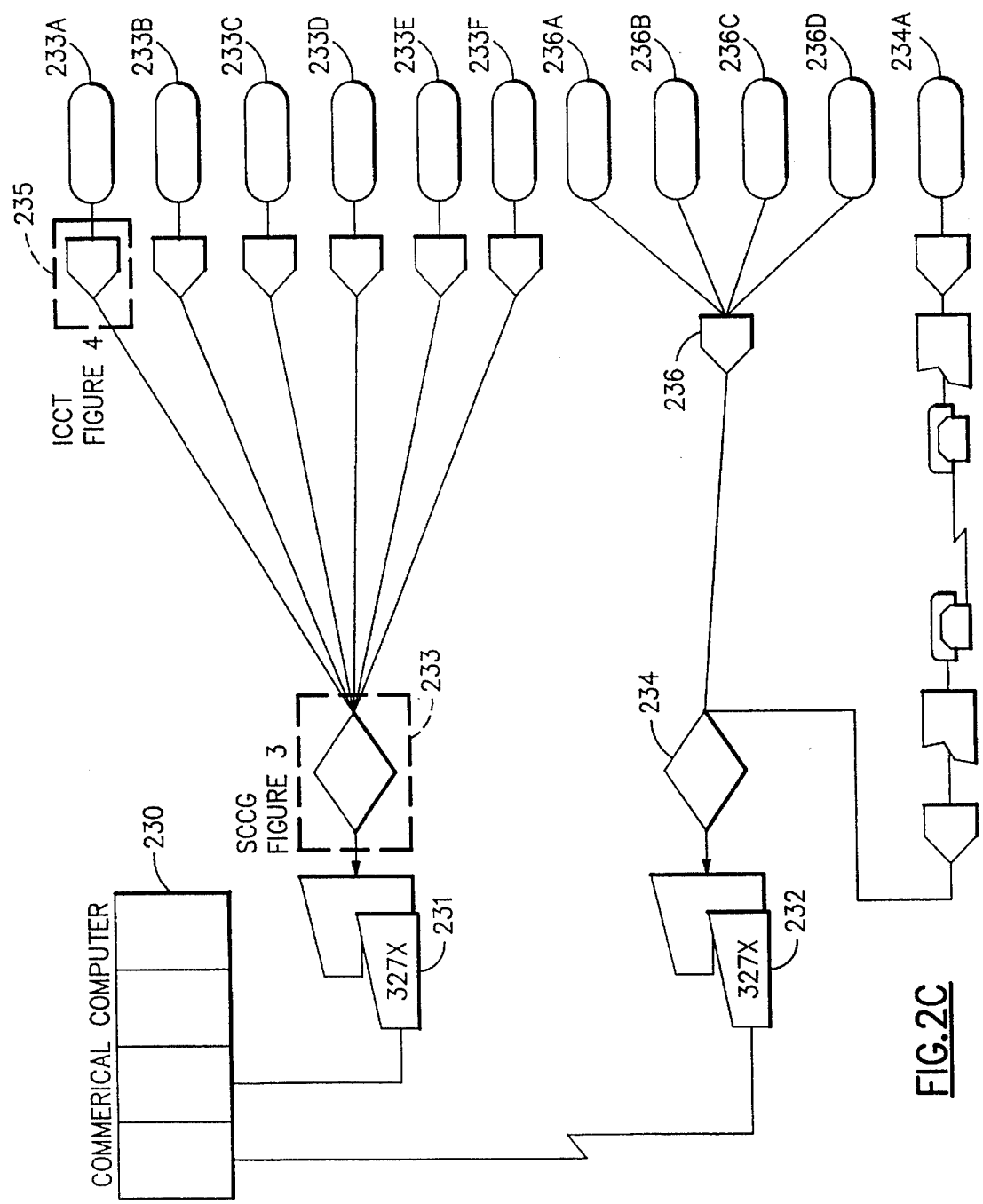
FIG. 2C shows the invention included in an environment controlled through a microcomputer network having remote stations.

FIGS. 2A, 2B and 2C show the insertion of this invention into all environments depicted in the preceding figures, clearly demonstrating the advantages of eliminating all such manual process.

Figure 3:
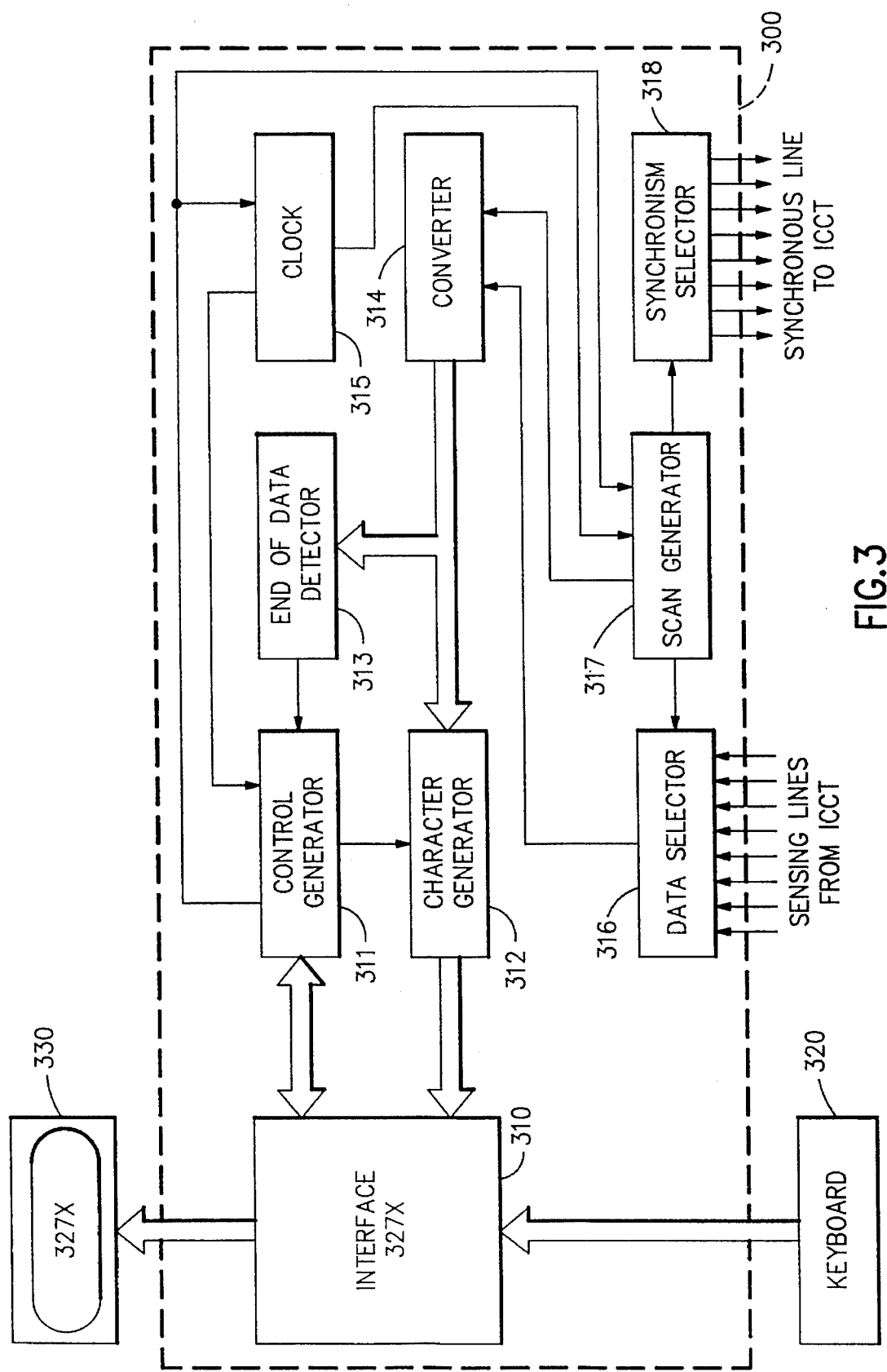
FIG. 3 displays a character generator, a scanner and a control (Scanner and Control and Character Generator—SCCG) all integrated, which are part of the invention.
Figure 4:
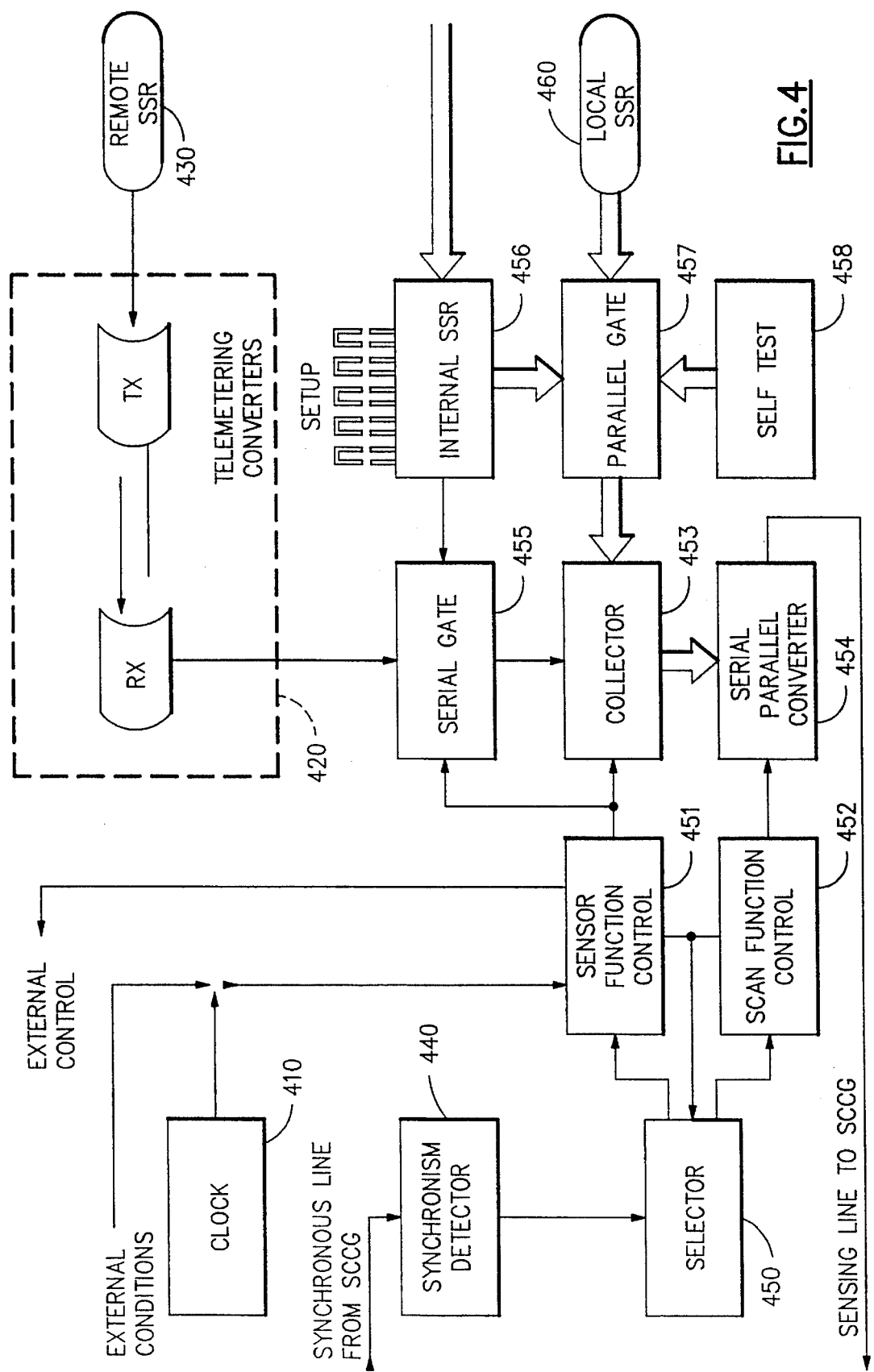
FIG. 4 shows an independent collector and a controlled transmitter (ICCT) all integrated, which are part of the invention.

FIG. 3 forms a block diagram of SCCG module (Scanner and Control and Character Generator). The interface with type 327X video terminal 310 is carried putting this module between the keyboard 320 and the video terminal 330, such that the user can choose normal operation without using SCCG functions, inactive mode, or a sensing operation using SCCG functions, active mode. In the latter, a clock 315 shall be actuated and causes the control of all its operations and communication functions of remote ICCT module (Independent Collector and Controlled Transmitter-)(FIG. 4).

Although operating independently, when a complete communication cycle is finished the SCCG module shall interrupt its operation, waiting for the company's computer system to inform the reception of its data and its readiness for another operation through its own terminal, when the SCCG shall start a new communication cycle.

At cycle start, SCAN GENERATOR 317 shall be actuated selecting a sensing line, which shall be connected on the other end to ICCT module. After the selection, a TIMING CLOCK 315 shall send a pulse train through the SCAN GENERATOR 317, having a time duration of no concern and which can be adjusted according to the desired operating speed. This shall cause the transmission of an information from ICCT module to SCCG module. Each of the sensors has an open interface, i.e. a published interface which indicates three lines for clock, control and data bits for sensed information. The clock and control bits are used only for transmission from the sensor to the ICCT module. The data only is sent to the SCCG module, and this transmission is done serially. The DATA SELECTOR 316 which is controlled through the SCAN GENERATOR 317 shall identify and receive the information from ICCT and send it to a CONVERTER circuit 314, for translation into parallel data that shall be provided to the remaining circuits from this point. The converter 324 converts the data bits of the sensor input to a format compatible with computer terminal 330. This conversion provides the data input to the terminal in byte lengths comparable it the terminal 330, although the converter need not and does not understand the sensor data input. Such conversion may require padding with additional zero data bits if the data byte length of the sensor input is shorter than the requisite data byte length of the terminal. Conversely, if the data byte length of the sensor input is longer than the requisite data byte length of the terminal, then the sensor data input will be split (with padding also if the sensor input data bytes are not an even multiple of the requisite terminal byte length). Also, the converter adds any parity and control bits required to communicate with the terminal. Having carried this operation, the CONVERTER 314 shall provide the translated data to the END OF DATA DETECTOR 313 circuit, which shall analyze and provide as a result two possible actions: either the same sensor is maintained of a change is made for another sensor as long as all data in the former sensor have finished.

If data are detected as information, a command shall be received by SCAN GENERATOR 317 via CONTROL GENERATOR in order the same sensing line is kept and thus the same ICCT module. At the same time, data captured by CHARACTER GENERATOR 312 shall be translated into the required pattern through the terminal and delivered, via INTERFACE 310 circuit, together with control signals to the terminal video 330. This operation shall be carried regardless of the received information content, free of any pattern or protocol comparison and allowing the use of any character formation logic, achieving if necessary full privacy of the received data, whether encoded or not, on the level of ICCT module.

Data converted this way shall be stored into the terminal storage, remaining there until the SCCG, by means of the CONTROL GENERATOR 311, releases the command that shall cause transmission of information to the company's computer system. From this point, the CLOCK 315 shall start a new pulse train that shall produce as a consequence a new data form response when reaching ICCT.

This process shall continue until the END OF DATA DETECTOR 313 identifies this condition. In this situation, the END OF DATA DETECTOR 313 shall send a command to the SCAN GENERATOR 317, in order it selects another sensing line and thus, a new ICCT and simultaneously causes an interruption of the entered data and orders the generation of an end-of-data signal in the interface. This signal shall tell the terminal that this said sensor has already finished its operation and communication to the next sensor shall begin.

The CLOCK 315 is again actuated and a new pulse train is started, which shall be sent to the current ICCT selected, repeating all the communication cycle mentioned before.

This process shall continue, until all sensors have been actuated and all information recorded into the video terminal storage.

At the end of this process, the CLOCK 315 shall interrupt its operation and the CONTROL GENERATOR 311 shall again undertake the control, causing the transmission of recorded information, via terminal, to the host computer, remaining in wait condition until the terminal acknowledges data acceptance indicating the possibility of a new operation.

Then, the CONTROL GENERATOR 311 actuates the SCAN GENERATOR 317 for selecting again the first ICCT and sends an activating signal to the CLOCK 315, which in turn shall begin a new pulse train, causing again process execution and thus indefinitely, until it is interrupted by means of an operating decision.

Server software within the computer knows the open interface of each sensor and the corresponding type of conversion made by converter 314. When the terminal storage is released to the computer, the server software, based on this knowledge, reconverts the terminal input to the original format provided by the sensor. This sensor input in the original format is then provided to a customer's application program which is accustomed to reading the data in this original format.

FIG. 4 is a block diagram of the lCCT module, presenting two main functional characteristics. If for one side it has totally independent operation for collection of information provided by any digital source, for the other it performs a controlled role concerning transmission of information collected for the SCCG module.

Switching between any one of these structural modes is caused by a circuit called SELECTOR 450, which functions in fact to control a mode input release only when authorized by the other.

In the beginning of the process the SELECTOR 450 shall actuate the SENSOR FUNCTION CONTROL 451, conducting the ICCT for an information collection. This information shall be obtained either in the serial of the parallel mode, or even from local sensors, as well as from remote ones, being also capable of using data from an internal sensor having several applications.

SENSOR FUNCTION CONTROL 452 in turn may also operate under condition either through its internal CLOCK 410 of an external control source. When operating in the mode under condition through the internal CLOCK 410, the latter shall supply the operating times for synchronism of all circuits, while being capable to adjust its speed by an external action. During this operation, any data presented in the PARALLEL GATE 437 shall be immediately charged into the COLLECTOR 453. Once afforded data integrity, the SENSOR FUNCTION CONTROL 451 shall supply the release of its collecting operation to the SELECTOR 450.

After receiving a release signal, the SELECTOR 450 shall wait the end of SYNCHRONISN DETECTOR 460 circuit operation, if any, and actuate the SCAN FUNCTION CONTROL 452. It shall stay in this condition until SCCG module activates a corresponding communication line and the SYNCHRONISH DETECTOR 440 returns to the actuated state.

When this occurs, the pulse train received by the SYNCHRONISH DETECTOR 640 shall be put under the SCAN FUNCTION CONTROL 652 through the SELECTOR 450 and actuate the PARALLEL/SERIAL CONVERTER 656, which shall send the data collected to SCCG in serial form.

At the end of this operation, the SYNCHRONISN DETECTOR 440 shall turn to inactive. In this condition it shall stay until a new pulse train sent by the SCCG module is again received and a new data transmission cycle carried through the SCAN FUNCTION CONTROL 452.

The process is repeated up to the moment when the last data from that collection have passed through the PARALLEL/SERIAL CONVERTER 454, thereafter the SELECTOR 450 released by the SCAN FUNCTION CONTROL 452 then passes the operation control to the SENSOR FUNCTION CONTROL 651 and a new collection cycle is started.

During serial collection the process is identical, differing only in the number of cycles necessary to perform the complete operation whether for internal conditions or the use of an external synchronism source.

When using TELEMETERING CONVERTERS 420, the operation shall be carried synchronously as well as asynchronously, with internal or external controls, according to the process explained above.

The ICCT has a multifunction sensor, INTERNAL SSR 656, that may be easily adapted to any conventional equipment for several applications, changing its functions according to the external connections shown into, FIG 4. All operations performed by the lCCT shall automatically add the information collected from sensors, the lCCT designative, making thus easy the identification of collected sensors by means of the company's computer.

The universal collection form and the concept of infinite information possibilities allow for the lCCT using multiple sensors in one single connection, in the same lCCT, including separate designatives for each sensor considered of not.

In one special mode of SELF TEST 458, the circuit shall be actuated such as to systematically send its designative to the SCCG, inhibiting the external information collection.

In industrial environments, where data privacy is a requirement, sensors may present encoded data in order they can be restored afterwards, beyond the SCCG module. Sensor measurements can be performed at any speed, up to the limit of about 500,000 times pep second and the transmission operation of information to the SCCG shall have its maximum limit at 26,000,000 bits per second approximately.

Figure 5:
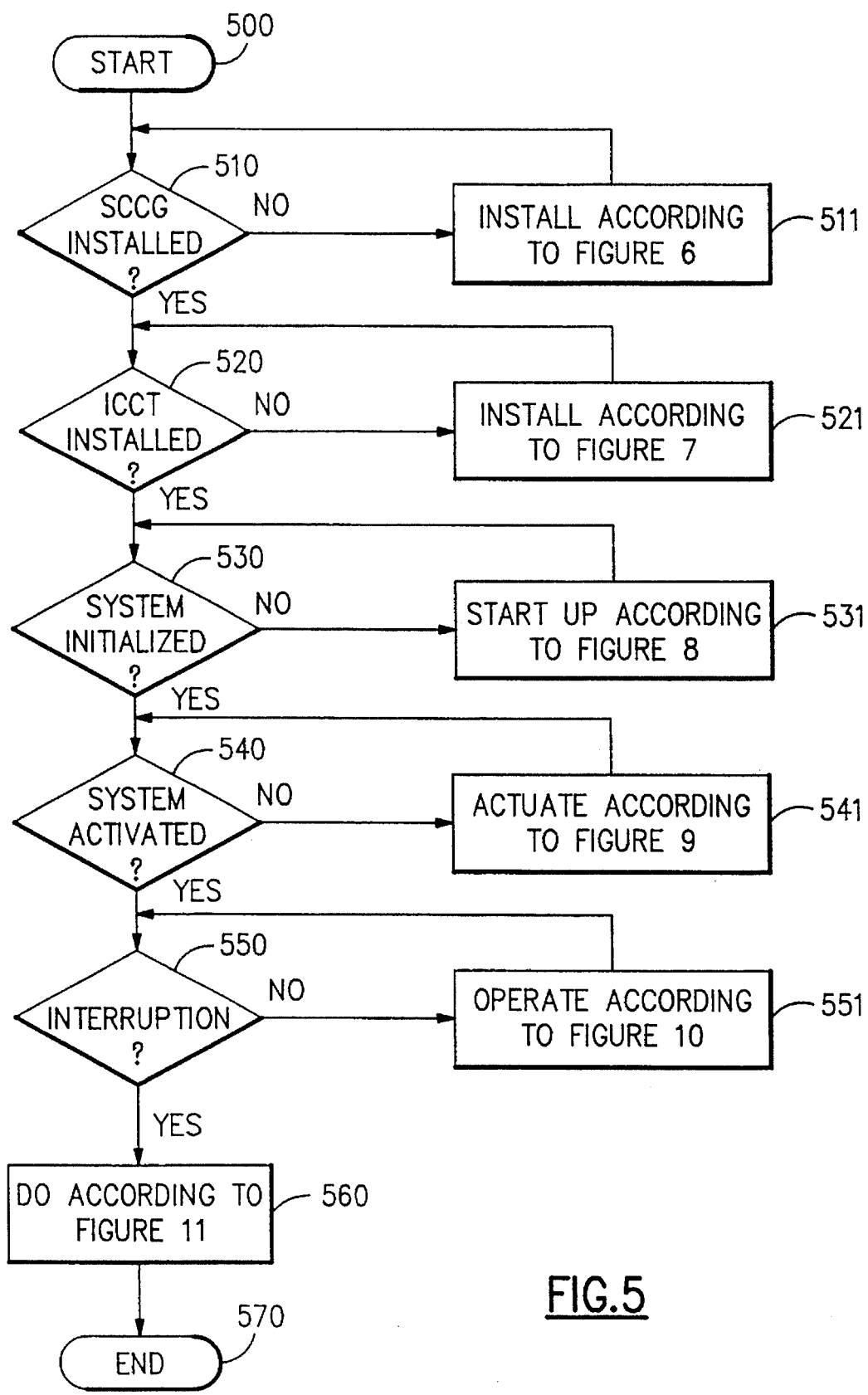
FIG. 5 depicts a flowchart of the general method for equipment operation.

FIG. 5 As a flowchart into which the steps of the equipment general operating method are presented through ordered sequential questions, according to the activities to be developed, such as the installation of the SCCG and lCCT modules, system start up and actuation and interruption handling with and without return to the equipment operating cycle.

To each question corresponds one figure that explains the activity in detail.

Figure 6:
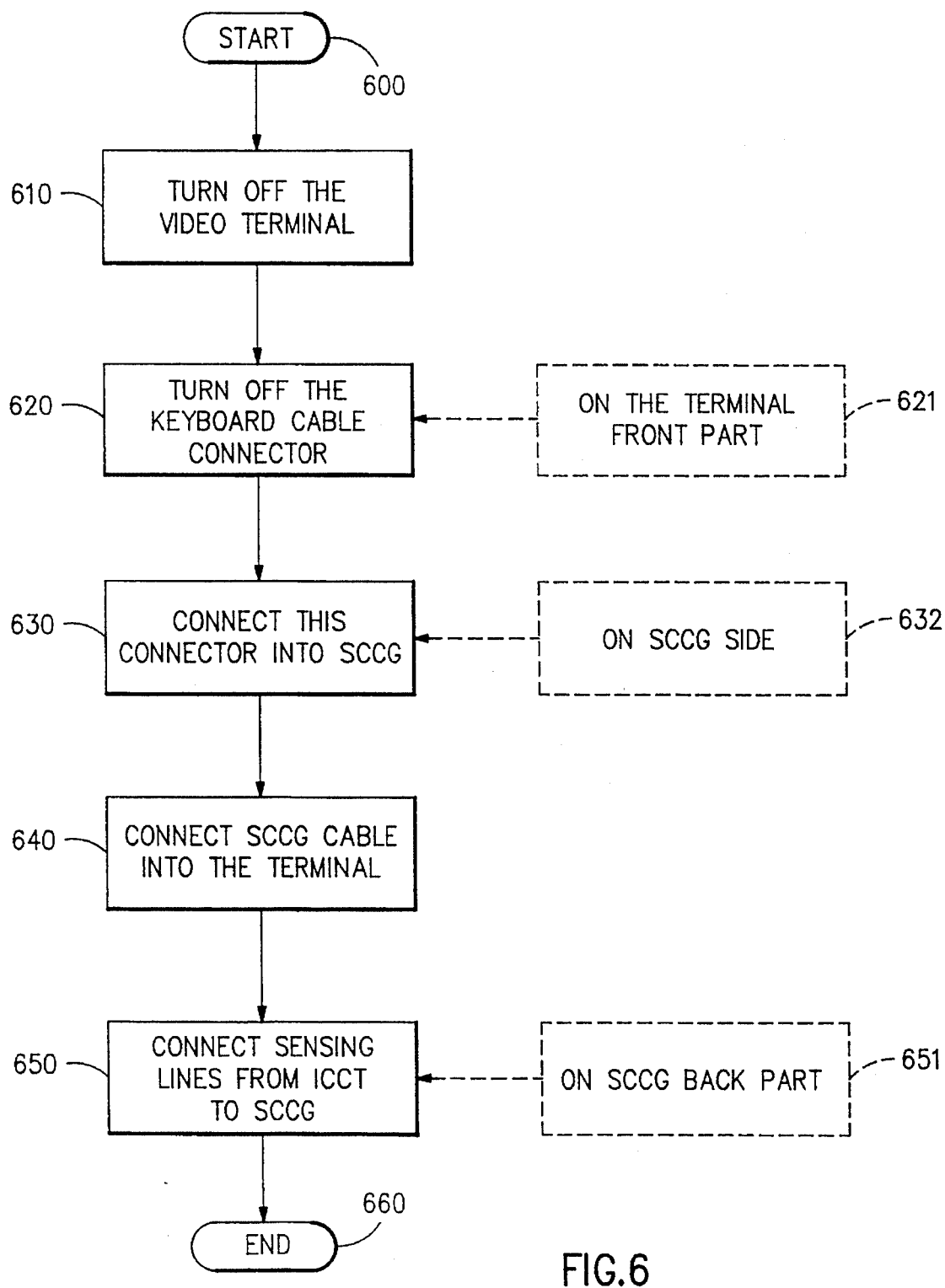
FIG. 6 shows a flowchart of the installation method of SCCG module of FIG. 3.

FIG. 6 is a flowchart that shows installation method steps of the SCCG module. To start installation, the ON/OFF switch shall be turned off on the 327X type video terminal 610 and then, the connection between keyboard and video unplugged through the removal of the keyboard cable from the connector located on the terminal front part 620, connecting it to the side of SCCG 630.

The SCCG cable shall be then connected to the video terminal 640 through the connector from where the keyboard cable has been removed. The sensing lines from lCCT to SCCG are then plugged into the back part of SCCG 650, finishing its installation.

Figure 7:
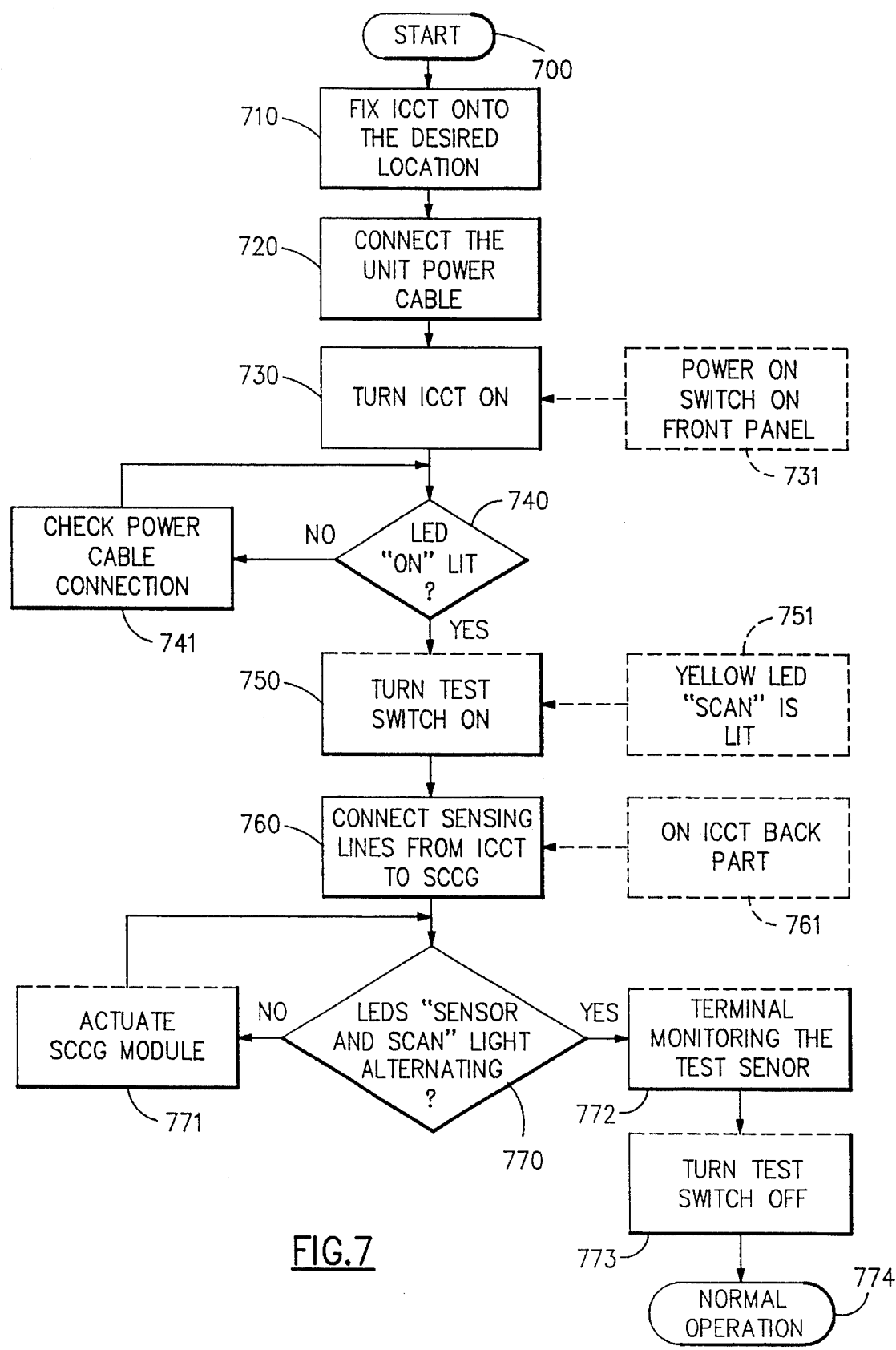
FIG. 7 illustrates a flowchart of the installation method of ICCT module of FIG. 4.

FIG. 7 is a flowchart into which steps of the ICCT module installation method are presented. To start installation, the ICCT shall be fixed on the desired location 710, connecting then the unit power cable 720. When the ICCT is powered on 730, the supply voltage indicating LED ("POWER ON") 731 shall light on the lCCT's front panel. If not, the connection of the power cable shall be checked 741.

On the same panel of ICCT the TEST switch 750 shall be then connected. The yellow SCAN LED shall light 751. The sensing lines from ICCT to SCCG shall be connected to the back part of ICCT 760.

In case the corresponding SCCG is activated, the red and yellow LEDS on the panel shall signal intermittently, if not, it shall be actuated 771. The 327X type video terminal shall be monitoring this sensor test operation 772. At the end of a successful test, the test switch shall be turned off 773 and manual operation shall begin 774.

Figure 8:
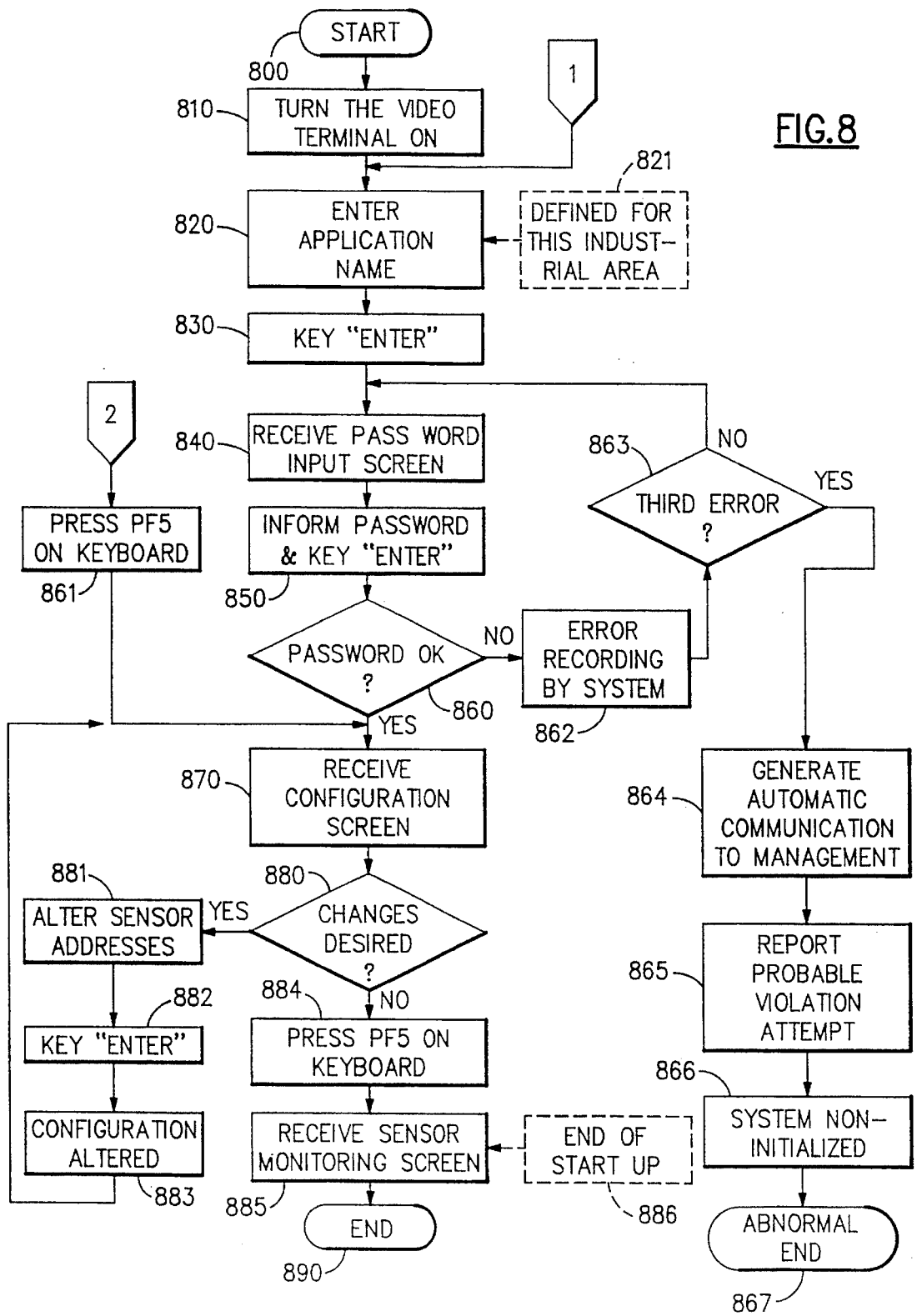
FIG. 8 shows a flowchart of the equipment initializing method.

FIG. 8 presents the method for equipment start up, which begins turning the video terminal on 810, of after an interruption type (input of FIG. 8) directly with the application name input defined a priority for a particular industrial area 820, and pressing the key ENTER on the terminal 830.

In video, at that time, the input screen for operator password shall appear 840, and he shall provide it to the system pressing again ENTER 850. The system controlling the equipment shall carry a password check, making up to three attempts possible 863, all of which are properly recorded as errors by the system 862, generating automatic communication to the administration 864 that shall assume a probable violation attempt 865 and cause an abnormal flow end 867, without finishing equipment start after the third unsuccessful try.

This password information process occurs during the first start up. However, when the system is interrupted and a new start up is needed, this information is not necessary and that part described below is accessed by the interruption handling method (FIG. 11), pressing PF5 on the terminal keyboard (input 2 of FIG. 8).

As the password has been acknowledged as correct, the operator receives the system configuration screen (sensor addresses) 870, having the option to alter it if desired, changing such addresses 881 and pressing ENTER once again 882. The new configuration is then shown on the screen and again the changing option is offered to the operator, that when satisfied shall press PF5 on the terminal keyboard 884, receiving then the sensor monitoring screens on the terminal video 885.

The equipment start up process shall be then finished.

FIG. 9 presents an equipment actuating method, which starts pressing the key FUNCTION 910 on the SCCG, which shall turn off the yellow LED KEYBOARD 920 and turn ON the red LED SENSOR 930, that indicate the equipment is ready to operate, The operator shall check then if the cursor is moving on the terminal screen and, if not, press the key RESET on the SCCG 941.

A new check related to the cursor state is carried. This time, if the cursor is not yet moving, the operator shall press the key FUNCTION 961, causing a reverse signalling compared to that first mentioned for LEDS. The red LED, SENSOR indicator, is turned off 962 and the yellow LED (KEYBOARD) is turned on 963.

The operator shall then press the key CLICKER 964 on the terminal keyboard and restart the process.

The actuation shall be complete when the cursor is moving.

It shall be noted that if an interruption occurs, causing cursor release, this actuation method is reached at the second question step concerning the cursor motion (input 3).

FIG. 10 represents an operating cycle of the equipment, into which sequential and continuous recording of those sensors connected to a given ICCT is performed 1010 and essential communication characters, protocols and controls are generated 1020. The equipment does not interface with the operating system application until data accuracy is thoroughly checked by means of their effective control and a recovery eventually necessary 1030. If data are correct, the information is sent to the system through a 327X type terminal and the achievement of previously defined patterns is performed 1040. In the event of deviations concerning these patterns, they shall be pointed out by a message dispatched to the are supervisor 1051, in order that the industrial process can be immediately corrected.

Figure 11:
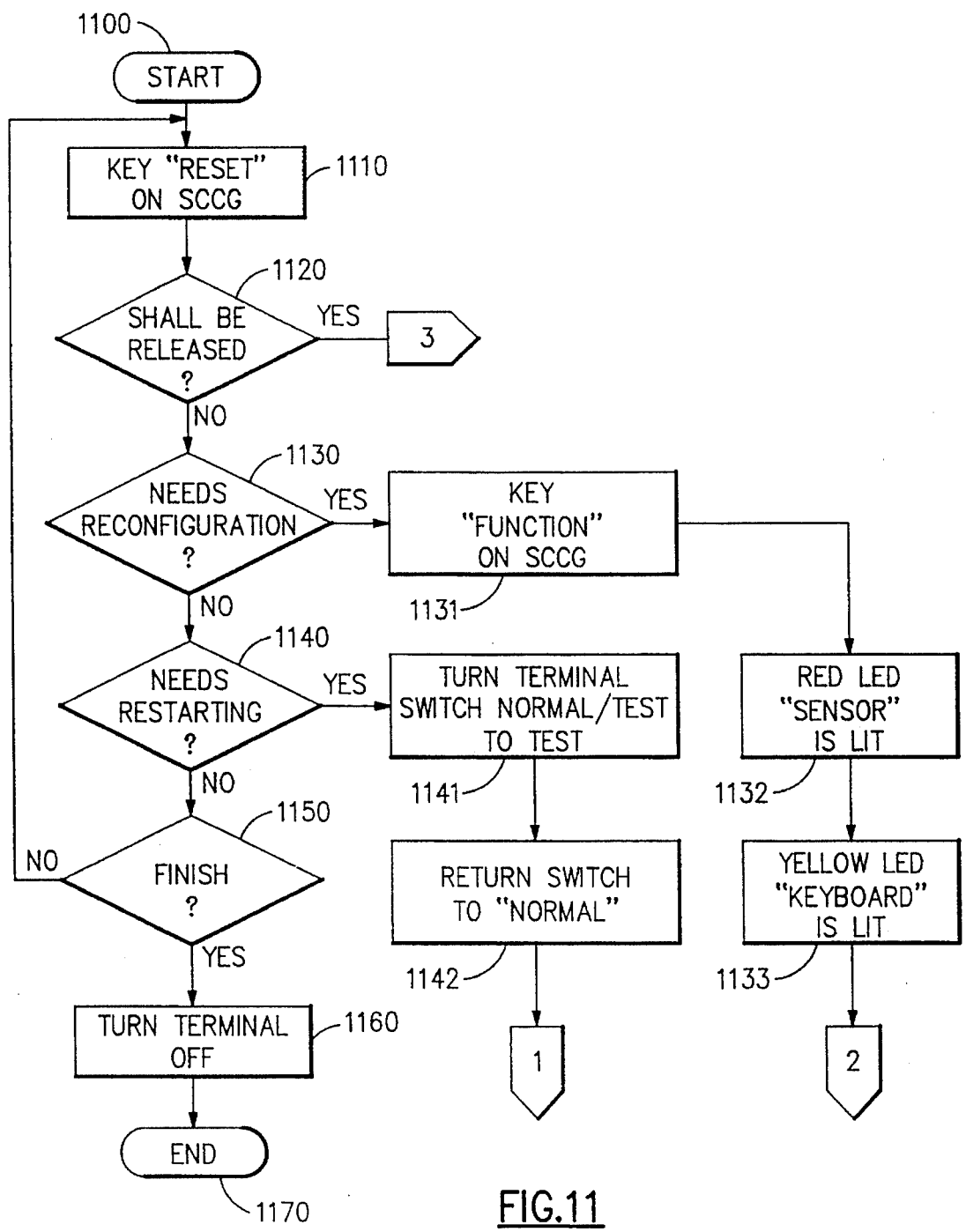
FIG. 11 depicts a flowchart of the interruption handling method with operating cycle restart and without it.

FIG. 11 presents the interruption handling method. When an interruption occurs the operator shall press instantly the key RESET on SCCG 1110. In case the cursor needs to be released, the actuation process (input 3 of FIG. 9) shall be re-entered, according to the description hereinbefore.

In case the system needs re-configuration, the operator shall key FUNCTION on the SCCG 1131, turning LED (SENSOR) off 1132 and yellow LED (KEYBOARD) on 1133 and then after re-enter the start up process from input 2, FIG. 8, already explained.

Similarly, when system restarting is necessary, the operator shall position key NORMAL/TEST on the terminal on TEST 1141 and afterwards return to NORMAL 1142 and to the start up process from input 1, FIG. 8.

In this moment the possible causes for interruption shall be removed and the equipment operated again, however if this does not happen the operator may finish sensing activities or not 1150, through terminal disconnection 1160.

The equipment interruption handling is finished.

Although the invention has been particularly described and shown concerning the preferred embodiment, those skilled in the apt shall understand that several changes may be made in-non-significant details without departing from its spirit, scope, teachings and applications. Therefore, the invention herein disclosed can only be correctly appreciated and limited through the scope of the following claims.

I claim:

1. Apparatus for input of digital sensor information from a plurality of sources to a computer for processing, each of said sources having a digital interface format and a clock for transmission of the digital sensor information, the clocks being asynchronous relative to each other and the formats being different than each other, said apparatus comprising:

a plurality of collector means for receiving digital sensor information from the plurality of sources, respectively, in the respective formats of the sources and with timing based on the respective clocks of the sources;

scan generator means, coupled to said plurality of collector means and having a clock which is different than and asynchronous to the clock(s) of said sources, for selecting each of said collector means;

converter means, coupled to the clock of said scan generator means and coupled to receive said sensor information from said plurality of collector means, for receiving said sensor information from each of said collector means when selected by said scan generator means and converting the format of said sensor information to a format compatible with said computer; and wherein each of said plurality of collector means includes means for transmitting the respective sensor information to said converter means based on timing signals provided by the clock of said scan generator means.

2. Apparatus as set forth in claim 1 further comprising interface means for coupling said converter means to said computer, whereby the converted sensor information is supplied to said computer for processing, said interface means including means for connecting to a keyboard and routing keyboard inputs to said computer substantially unaffected by said interface means.

3. Apparatus as set forth in claim 1 wherein each of said collector means includes a clock to time input of sensor information from the respective source and means for receiving timing signals from said respective source control timing of input of sensor information from said respective source.

4. Apparatus as set forth in claim 3 wherein said collector means includes means for receiving an external signal to control speed of said clock.

5. Apparatus as set forth in claim 1 wherein each of said collector means includes means for synchronizing with said scan generator means after receipt of the respective sensor information far transmitting the respective sensor information en route to said converter means.

6. Apparatus as set forth in claim 1 wherein said computer includes means for reconverting the converted sensor information into an original format of said sensor information.

7. Apparatus as set forth in claim 1 wherein said scan generator means selects each of said collector means based on the clock of said scan generator means.

8. Apparatus as set forth in claim 1 wherein each of said collector means sends its sensor information to said converter means serially and said converter means sends said sensor information to said computer in parallel bytes.

* * * * *